United States Patent [19]
Ueki et al.

[11] 3,932,890
[45] Jan. 13, 1976

[54] DEVICE FOR ELIMINATING TAPE SLACK IN A MAGNETIC TAPE RECORDING AND REPRODUCING APPARATUS

[75] Inventors: Yoshiharu Ueki; Yoshio Maruyama; Yoshihiro Magata; Akihiro Fushimi; Katsuhisa Shimizu, all of Kawagoe, Japan

[73] Assignee: Pioneer Electronic Corporation, Tokyo, Japan

[22] Filed: Mar. 22, 1974

[21] Appl. No.: 453,895

[30] Foreign Application Priority Data
Mar. 24, 1973  Japan.............................. 48-33974

[52] U.S. Cl. ..................... 360/75; 360/74; 360/105
[51] Int. Cl.² .................. G11B 21/02; G11B 15/43; G11B 5/54
[58] Field of Search ........... 360/69, 74, 75, 96, 105; 226/11, 33, 43; 242/186, 191

[56] References Cited
UNITED STATES PATENTS
3,620,429  11/1971  Kozu................................... 360/74
3,647,989  3/1972  Mattas................................. 360/74
3,779,498  12/1973  Takashino........................... 360/105

*Primary Examiner*—Bernard Konick
*Assistant Examiner*—R. S. Tupper
*Attorney, Agent, or Firm*—Sughrue, Rothwell, Mion, Zinn & Macpeak

[57] ABSTRACT

A tape recording and reproducing apparatus utilizing a tape cassette is disclosed which eliminates the tape slack between supply reel and take-up reel. When the tape cassette is placed in the play position, the take-up reel is rotated in the forward direction to remove the tape slack. Then the supply reel is started to rotate by the stretched tape. A detecting device is provided to detect the rotation of the supply reel in the forward direction. The detecting device triggers a control device which in turn causes the tape transport mechanism to come into engagement with the tape ordinary play mode.

6 Claims, 6 Drawing Figures

FIG. 3
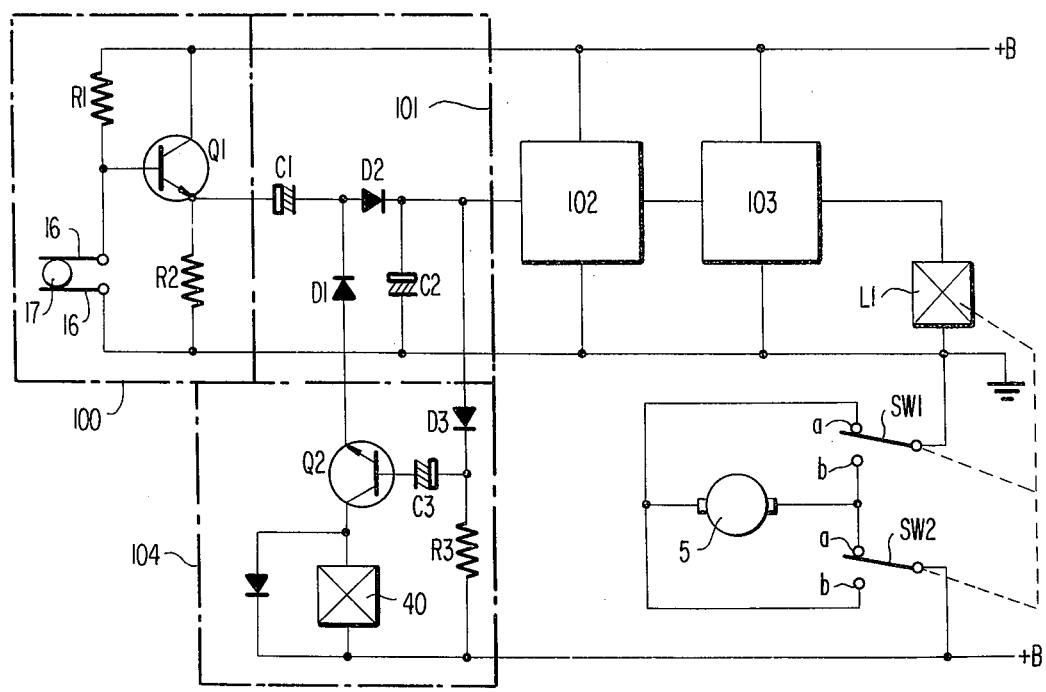
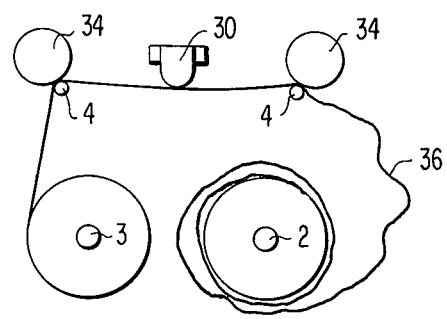
FIG. 4A
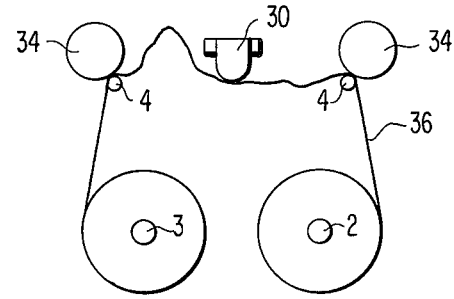
FIG. 4B
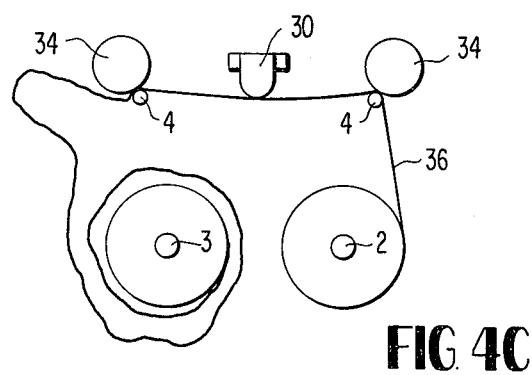
FIG. 4C 3,932,890

DEVICE FOR ELIMINATING TAPE SLACK IN A MAGNETIC TAPE RECORDING AND REPRODUCING APPARATUS

BACKGROUND OF THE INVENTION

The present invention is in general directed to an improvement of a magnetic and reproducing apparatus of the type utilizing open-reel or cassette magnetic tape, and more particularly to a magnetic recording and reproducing apparatus having the function of preventing unstable operation due to the slack of the magnetic tape between the supply reel and the take-up reel.

For the better understanding of the present invention, some disadvantageous phenomena encountered in the tape recording and reproducing apparatus of the prior art due to slack the magnetic tape will first be studied briefly with reference to FIG. 4 in which some examples of malfunction due to tape slack in a tape recording and reproducing apparatus of dual capstan type are illustrated.

FIG. 4A shows an example in which slack exists in the tape portion of supply reel side. In this case, tape tension in the magnetic head 30 side, being bounded by the capstan 4, becomes larger than that of supply reel 2 side, which causes some portion of the magnetic tape 36 to be protruded out of the capstan 4 and pinch roller 34, resulting in twisting or cutting of the tape 36 as well as deterioration of wow-flutter characteristic.

FIG. 4B shows an example in which slack of the tape 36 exists between the capstan 4 and another capstan 4. In this case, tape transferring at constant speed may not be obtained, and noises and signal drop-out due to unstable contact between the tape 36 and the magnetic head 30 will be encountered.

FIG. 4C shows an example in which slack of the tape 36 exists in take-up reel 3 side. In this case, since the take-up reel cannot absorb all of slack, the remained slack portion of the tape 36 may occasionally happen to twist around another member of the recording and reproducing apparatus.

Although those examples have been described about the magnetic recording and reproducing apparatus of the type of dual capstan, these disadvantageous phenomena may also be encountered in a recording and reproducing apparatus of the type of single capstan. As described above, slack of magnetic tape existing before the tape is started to play may deteriorate the performance of such magnetic recording and reproducing apparatus.

In order to avoid such disadvantage as described above in connection with the example shown in FIG. 4A, the prior art has attempted to increase the accuracy of parallelism between capstan and pinch roller. This and other attempts, however, have not been successful as a practical matter.

Accordingly, it is an important object of the present invention to provide an improved magnetic recording and reproducing apparatus in which slack of tape can be eliminated for stable performance in advance before magnetic head contacts the tape and the tape is started to play.

The novel features which are considered as characteristic of the present invention will be set forth in particular in the appended claim. The improved magnetic recording and reproducing apparatus itself, however, both as to its construction and its mode of operation, together with additional features and advantages thereof, will be best understood upon perusal of the following detailed description of a specific embodiment with reference to the accompanying drawings in which;

BRIEF DESCRIPTION OF THE DRAWINGS

FIG. 3 is a circuit diagram of a control device for the apparatus shown in FIG. 1 and FIG. 2, and FIGS. 4A–4C show diagrams for several condition in which tape slack is generated in the prior art devices.

DETAILED DESCRIPTION OF EMBODIMENT OF THE INVENTION

Figure 1:
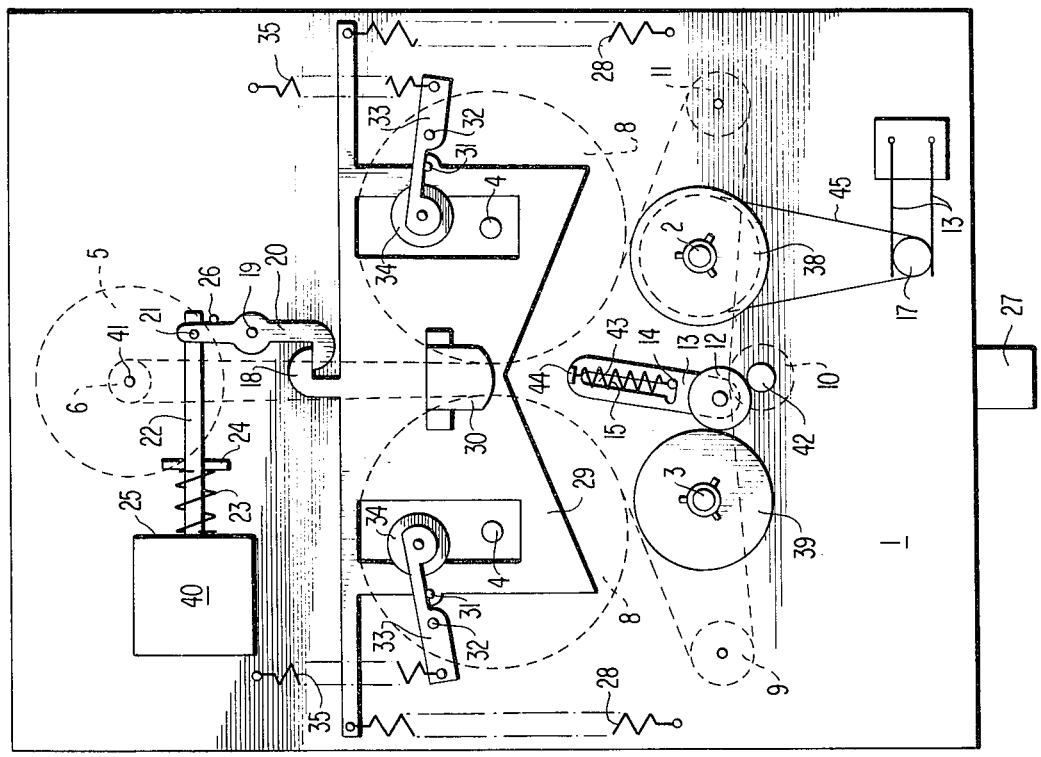
FIG. 1 is a top plan view showing the essential internal construction in "play" mode, which embodies the present invention in a cassette type tape recording apparatus.
Figure 2:
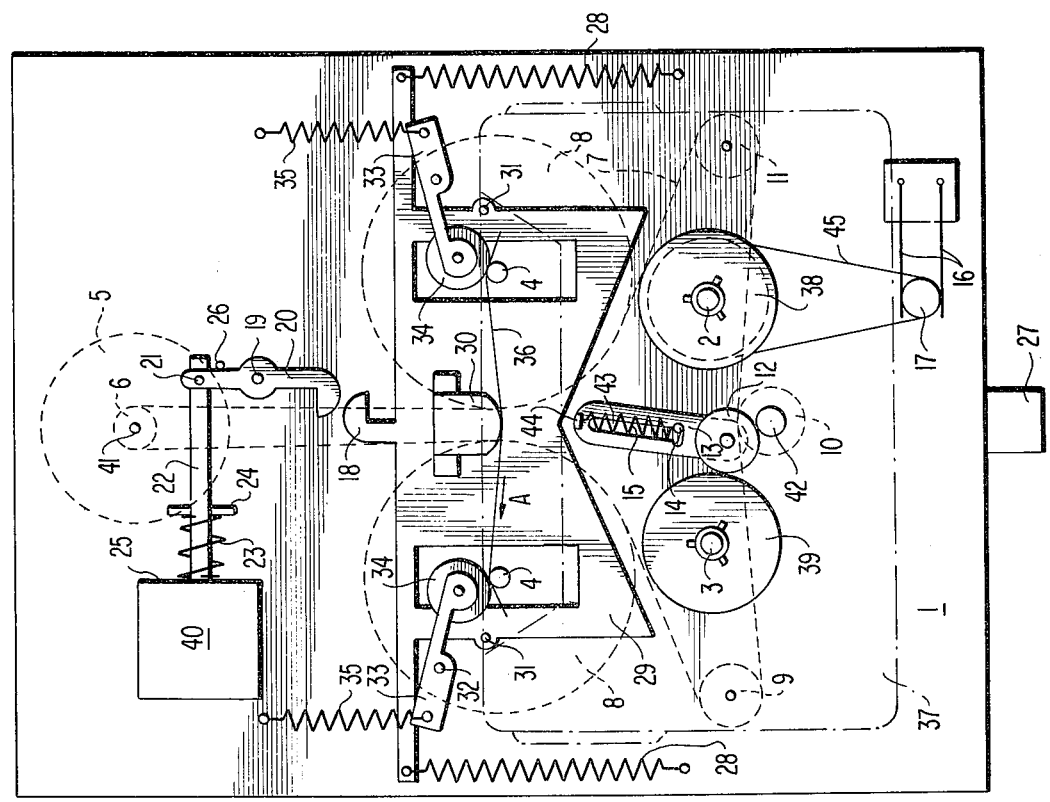
FIG. 2 is a top plan view showing the essential internal construction in "non-play" mode, which embodies the present invention in a cassette type tape recording apparatus.

Now referring to FIG. 1 and FIG. 2, in the drawings, reference numeral 1 shows a chassis, on which a pair of reel drive spindles 2 and 3, and a pair of capstans 4 and 4 are rotatably mounted in a predetermined relation. The chassis 1 also includes an electric motor 5 for driving the reel drive spindles 2 and 3 and the capstans 4 and 4. An endless belt 7 is provided to pass around a motor pulley 6 secured to the rotor shaft motor 5, a flywheel 8 attached to one of the capstan 4, three pulleys 9, 10 and 11, and a flywheel 8 secured to the other capstan 4. A rotating shaft 42 to which the pulley 10 is secured extends upwardly through the chasis 1, an idle pulley 12 is positioned close to the rotating shaft 42 and supported rotatably on one end of a lever 13. The rotating shaft 42 is positioned to be equally spaced from both the reel drive spindles 2 and 3. The lever 13 is held on the chasis 1 by a pin 14 that engages movably with a slot 43 thereof. On the other end of the lever 13, there is provided tab portion 44 to which one end of a spring 15 is recured. The other end of the spring 15 engages the pin 14, and the spring 15 serves to press the idle pulley 12 against the rotating shaft 42. The idle pulley 12 is also pressed against supply reel mount 38 or take-up reel mount 39 in accordance with the rotating direction of the rotating shaft 42. Thus, the rotation of the rotating shaft 42 may be transmitted to the take-up reel mount 39 through the idle pulley 12 when the shaft 42 rotates in the forward direction (the direction of the tape movement shown by an arrow A in FIG. 1). When the rotation of the motor 5 is reversed, the idle pulley 12 is switched to the supply reel mount 38 so as to cause its rotation.

On the other hand, the chassis 1 supports a carriage 29 which is movable between the first position close to a tape cassette 37 placed in "play" position as shown in FIG. 1, and the second position spaced from the first position as shown in FIG. 2, and is usually biased to be retained in the first position by a spring 28. A magnetic transducer head 30 and a pair of pins 31 and 31 are placed on the carriage 29, and each pin 31 is positioned to about on the free end of a supporting frame 33 which is pivotaly mounted on a shaft 32 on the chassis. The supporting frame 33 holds rotatably a pinch roller 34 and is biased by a spring 35 so that the pinch roller 34 approaches to the capstan 4. The pin 31 abutting the supporting frame 33 permits the supporting frame 33 to rotate so as to press the pinch roller 34 against the capstan 4 when the carriage 29 is in the first position shown in FIG. 1, and serves to rotate the supporting frame 33 against the spring 35 so as to separate the pinch roller 34 from the capstan 4 in the process in which the carriage 29 is shifted from the first position to the second position.

In order to release the carriage 29, there is provided an ejection button 27. By depressing the ejection button 27, a rod (not shown in the drawings) shifts the carriage 29, and a memeber 18 attached to the carriage 29 engages a rockable retaining lever 20 rotatably supported on the chassis 1 by a shaft 19, thereby causing the carriage 29 to be retained in the second position as shown in FIG. 2. The other end of the rockable retaining lever 20 is connected to a plunger 22 of an electro-magnet 40 through a pin 21. A compression spring 23 is provided between the front wall 25 of the electro-magnet 40 and a stopping member 24 secured to the plunger 22, which serves to rotate the rockable retaining lever 20 around the shaft 19 in the clockwise direction in the drawings. However, the rockable retaining lever 20 is blocked to rotate by a stopper pin 26 secured to the chassis 1.

A sensing rotor 17 which is connected to the supply reel mount 38 through a belt 45 is provided to detect when the supply reel mount 38 is rotated in the forward direction. The sensing rotor 17 is provided with electric conducting portion partly around the peripheral surface thereof so as to short-circuit intermittently a pair of sensing members 16 and 16 when it rotates.

Referring now to FIG. 3 a control circuit for the apparatus will be described below.

A pulse signal detecting circuit 100 comprises a transistor Q1, to the base electrode of which one end of a biasing resistor R1 and one of the sensing members 16 of the sensing rotor 17 are connected. The other end of the biasing resistor R1 is connected to the power supply and another sensing member 16 is grounded. A voltage doubler rectifying circuit 101 includes capacitor C1 and C2, and diodes D1 and D2. The emitter electrode of the transistor Q1 in the pulse signal detecting circuit 100 is coupled to one end of the capacitor C1 in the voltage doubler rectifying circuit 101. The out-put of the voltage doubler rectifying circuit 101, that is, the cathode of the diode D2 is coupled to input of a Schmitt tigger circuit 102 and also to the anode of diode D3 in plunger control circuit 104. The Schmitt trigger circuit 102 is constructed so as to switch its (conducting) state when a signal having higher level than a predetermined level is applied, and generate negative or positive pulse in turn. Out-put pulse from the Schmitt trigger circuit 102 is applied to a flip-flop circuit 103, out-put signal of which will control a relay L1. The relay L1 serves as reversing means for a double-pole double-throw switch SW1 and SW2 which permits the motor 5 to rotate either in the forward direction or backward direction. The flip-flop circuit 103 may be switched only when negative pulse signal is applied through a gate circuit. That is, when a tape cassette 37 is loaded in position and thereby the power supply is actuated, the out-put of the flip-flop 103 energizes the relay L1 so that the traveling contacts of the double-pole double-throw switch SW1 and SW2 come into contact with stationary contacts $a$ and $a$ respectively to rotate the motor 5 in the forward direction, and when a negative pulse is applied to the flip-flop circuit 103 to switch its state, the relay L1 is deenergized and the traveling contacts of the double-pole double-throw switch SW1 and SW2 come into contact with stationary contacts $b$ and $b$ respectively to rotate the motor 5 in the backward direction.

The plunger control circuit 104 includes a transistor Q2, a diode D3, a capacitor C3 and a resistor R3. The cathode of the diode D3 and one end of the resistor R3, having the other end grounded are connected to one end of the capacitor C3. The other end of the capacitor C3 is coupled to the base electrode of the transistor Q2, and the collector electrode thereof is connected to the power supply through the electro-magnet 40. The emitter electrode of the transistor Q2 is grounded.

The operation of the recording and reproducing apparatus embadying the present invention as described above will now be described.

When a tape cassette is placed in the predetermined position, an electric switch (not shown in the drawings) is closed by way of the conventional fashion to cause the motor 5 to rotate in the forward direction. With the rotation of the motor 5, the flywheel 8 and 8, and the pulleys 9, 10 and 11 start to rotate. The idle roller 12 abutting with the rotating shaft 42 is pressed against the take-up reel mount 39 in accordance with the rotating direction of the rotating shaft 42. Thus, the rotation of the shaft 42 can be transmitted to the take-up reel mount 39 through the idle roller 12. In this condition, if there is tape slack in the tape 36 wound on the take-up reel or supply reel or between them, only the reel drive spindle 3 will rotate until the tape slack is removed. When all the tape slack is eliminated completely and the reel drive spindle 3 continues to rotate, the reel drive spindle 2 starts to rotate due to the tape tension of the tape wound up to the take-up reel, resulting in the rotation of the reel drive spindle 2 in the forward direction. Consequently, the sensing rotor 17 connected with the belt 45 to the reel drive spindle 2 will rotate. By the rotation of the sensing rotor 17, the sensing members 16 and 16 are short-circuited intermittently to generate pulse signals. Generation of the pulse signal is the indication of completion of tape slack removal. Thus, the pulse signal detcting circuit 100 generates pulse signals which is in turn applied to the voltage doubler rectifying circuit 101. D.C. out-put voltage of the voltage doubler rectifying circuit 101 is supplied both to the Schmitt trigger circuit 102 and the plunger control circuit 104. The signal applied to the Schmitt trigger circuit 102 causes the circuit to switch to the reversed state to generate positive out-put pulse, which is in turn applied to the flip-flop circuit 103. Since the flip-flop circuit 103, however, is constructed so that the circuit may be triggered only when negative pulse is applied thereto, the positive out-put pulse of the Schmitt trigger circuit 102 may not switch the flip-flop circuit 103, and the motor 5 continues to rotate in the forward direction.

On the other hand, the signal applied to the plunger control circuit 104 actuates the electro-magnet 40, which in turn draws the plunger 22 thereinto, and thereby rotates the rockable retainging lever 20 in the anti-clockwise direction around the shaft 19 secured to the chassis 1 so as to release the member 18. Accordingly the carriage 29 will be released from the second position as shown in FIG. 2 and shifted to the first position shown in FIG. 1 by the action of the spring 28. Thus, the magnetic head 30 comes into engagement with the tape in the cassette already placed in position through the aperture thereof, while the supporting frame 33 is released from blocking by the pin 31 due to the action of the spring 35, and the pinch roller 34 is pressed against the capstan 4. Thus, the tape 36 is pinched at two points by the capstan 4 and 4, and the pinch roller 34 and 34, and comes into constant speed movement.

While the capacitor C3 is being charged, the transistor Q2 is maintained in ON state. With accomplishment of charging, the transistor Q2 is turned into OFF state, and the electro-magnet 40 is deenergized. Consequently the plunger 22 is pushed forwards by the spring 23 so as to return the rockable retaining lever 20 to the original position.

When the tape cassette 37 is played to reach the end of the tape 36, the reel mount 38 will stops rotating because the end portion of the tape 36 is secured to the reel hub. Thus, the sensing rotor 17 also ceases rotation, and no pulse signal is generated from the pulse signal detecting circuit 100. Then the D.C. out-put voltage of the voltage doubler rectifying circuit 101 decreases and consequently the Schmitt trigger circuit 102 will switched. When the Schmitt trigger circuit 102 is reversed, a negative pulse is generated, which is applied to cause the flip-flop circuit 103 to switch into the reversed state. The flip-flop circuit 103 serves to reverse the double-pole double-throw switch SW1 and SW2 from a side position to b side position by way of the relay L1 so as to actuate the motor 5 to rotate in the backward direction. Thus, the sensing rotor 17 is used both to detect the completion of tape slack removal and to detect the end of the tape.

From the foregoings, it may be apparent that the present invention may prevent the magnetic tape from the damage of curling or cutting-out due to tape slack and accomplish stable transferring of the tape.

Although the present invention has been described with respect to a certain specific embodiment, it will be appriciated that modifications and changes may be made by those skilled in the art without departing from the true spirit and scope of the invention. In particular, although a recording and reproducing apparatus of the type of dual capstan, the present invention will fine equal application in a recording and reproducing apparatus of single capstan type.

What is claimed is:

1. In a tape recording and reproducing device of the type having rotatable supply and take-up spindles engaging tape supply and take-up reels, at least one capstan, means to rotate said supply spindle in a reverse direction, at least one pinch roller selectably engageable with said capstan, a motor driven means to rotate said at least one capstan for feeding the tape in a forward direction when said at least one pinch roller is engaged with said at least one capstan, a movable carriage having a transducer head and means to control the engagement of said at least one pinch roller with said capstan mounted thereon and mounting means to mount said carriage so as to be movable between a first position wherein said transducer head and said at least one pinch roller are out of contact with said tape and said at least one capstan respectively, and a second position wherein said transducer head and said at least one pinch roller are in contact with said tape and said at least one capstan, respectively, the improvements comprising:
    a. means to rotate said take-up spindle in a forward direction so as to wind the tape thereon by running the motor in a forward direction,
    b. means for sensing the rotation of the supply spindle in the forward direction, and
    c. means responsive to said activation of the forward spindle drive and forward rotation of said supply spindle to move the carriage to the second position so as to engage the transducer head with the tape and bring said at least one pinch roller in contact with said at least one capstan.

2. The improved tape recording and reproducing device of claim 1 wherein said means responsive to the activation of the forward spindle drive also activates the means to rotate said supply spindle in a reverse direction upon cessation of rotation of the supply spindle in the forward direction.

3. The improved tape recording and reproducing device of claim 1 wherein the sensing means comprises:
    a. pulse generator means to generate an electrical pulse when driven by said supply spindle,
    b. pulse signal detecting means connected to said pulse generating means, to detect and transmit electrical pulses generated by said pulse generator,
    c. rectifying means connected to said pulse signal detecting means, to rectify the electrical pulses transmitted by said pulse signal detecting means,
    d. threshold means responsive to the output of said rectifying means to generate and output signal when output of said recitfying means reaches a predetermined level, and
    e. switch means responsive to the output of said threshold means to change direction of the motor.

4. The improved tape recording and reproducing device of claim 3 wherein said threshold means is a Schmitt trigger.

5. The improved tape recording and reproducing device of claim 3 wherein said responsive means includes carriage control means responsive to the output of said rectifying means.

6. The improved tape recording and reproducing device of claim 5 wherein said carriage control means comprises:
    a. a solenoid having a plunger mechanically connected to a first hook pivotally attached to a stationary support structure,
    b. switch means connected to the output of said rectifying means and electrically connected to said solenoid to selectively supply electric current to said solenoid,
    c. a second hook rigidly attached to said movable carriage, said second hook engaging said first hook when said carriage is in a position wherein said transducer head is disengaged from said tape, and
    d. spring means attached to said movable carriage and a stationary support structure to normally bias said carriage away from said first hook.

* * * * *